United States Patent
Kim et al.

(10) Patent No.: US 10,078,331 B2
(45) Date of Patent: Sep. 18, 2018

(54) SYSTEM AND METHOD FOR DETERMINING TRANSFER OF DRIVING CONTROL AUTHORITY OF SELF-DRIVING VEHICLE

(71) Applicants: HYUNDAI MOTOR COMPANY, Seoul (KR); KIA MOTORS CORPORATION, Seoul (KR)

(72) Inventors: Sung Yun Kim, Seoul (KR); Jun Soo Kim, Seoul (KR); Dong Hwi Lee, Suwon-si (KR); Min Wook Seo, Suwon-si (KR); Su Jung Yoo, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/634,504

(22) Filed: Jun. 27, 2017

(65) Prior Publication Data
US 2018/0173225 A1    Jun. 21, 2018

(30) Foreign Application Priority Data
Dec. 16, 2016    (KR) .......................... 10-2016-0173038

(51) Int. Cl.
*G05D 1/00* (2006.01)
*B60K 28/02* (2006.01)

(52) U.S. Cl.
CPC ................................ *G05D 1/0061* (2013.01)

(58) Field of Classification Search
CPC ...... G05D 1/0061; B60K 29/02; B60K 28/06; B60W 50/08; B60W 30/14; B60W 40/02
USPC ........................................................ 701/23, 36
See application file for complete search history.

(56) References Cited

U.S. PATENT DOCUMENTS

| | | | |
|---|---|---|---|
| 2002/0140562 A1* | 10/2002 | Gutta | G08B 21/06 340/576 |
| 2004/0124985 A1* | 7/2004 | Young | G08B 21/06 340/575 |
| 2011/0074629 A1 | 3/2011 | Khan et al. | |
| 2012/0215403 A1* | 8/2012 | Tengler | B60W 50/12 701/36 |

(Continued)

FOREIGN PATENT DOCUMENTS

| KR | 10-2014-0043536 A | 4/2014 |
|---|---|---|
| KR | 10-2014-0106939 A | 9/2014 |

(Continued)

*Primary Examiner* — Tan Q Nguyen
(74) *Attorney, Agent, or Firm* — Brinks Gilson & Lione

(57) ABSTRACT

Disclosed is a system for determining transfer of driving control authority of a self-driving vehicle. The system includes: a risk calculation device that recognizes a sight line of a driver to calculate a risk when the driving control authority of the self-driving vehicle is transferred, a determination reference calculation device that calculates a determination reference to determine whether the driving control authority of an acceleration pedal, a deceleration pedal, and a steering wheel of the self-driving vehicle is able to be transferred based on the calculated risk, and a determination device that determines whether to transfer the driving control authority of the self-driving vehicle based on the calculated determination reference.

14 Claims, 10 Drawing Sheets

(56) References Cited

U.S. PATENT DOCUMENTS

2014/0121927 A1* 5/2014 Hanita .................. B60T 7/14
                                                  701/70
2016/0214619 A1* 7/2016 Na ..................... B60W 10/20
2017/0242433 A1* 8/2017 Ochiai ................ G05D 1/0055

FOREIGN PATENT DOCUMENTS

KR    10-2015-0143139 A    12/2015
KR        10-1650791 B     8/2016

* cited by examiner

SYSTEM AND METHOD FOR DETERMINING TRANSFER OF DRIVING CONTROL AUTHORITY OF SELF-DRIVING VEHICLE

CROSS-REFERENCE TO RELATED APPLICATION

This application claims priority to and the benefit of Korean Patent Application No. 10-2016-0173038, filed on Dec. 16, 2016, which is incorporated by reference in its entirety.

FIELD

The present disclosure relates to a system and a method for determining transfer of driving control authority of a self-driving vehicle, and more particularly, to a technique of safely transferring the driving control authority of the self-driving vehicle to a driver.

BACKGROUND

The statements in this section merely provide background information related to the present disclosure and may not constitute prior art.

There is a driver assistance system to assist a driver who drives a vehicle. For example, the driver assistance system includes adaptive cruise control (ACC), a lane departure warning system (LDWS), and a lane keeping system (LKS).

Such a driver assistance system has an advantage of enhancing convenience in driving by assisting the driver in the longitudinal or lateral control of the vehicle. Meanwhile, there is a constraint that such a driver assistance system must be prepared for driver intervention. Therefore, the conventional driver assistance system cannot assist a driver in a situation where the driver is drowsily driving or cannot drive due to health problems.

In addition, in recent years, research has been conducted on a self-driving vehicle capable of traveling without a driver intervening from a departure point to a destination. However, sensor recognition and judgment errors may occur depending on a driving environment such as a road or weather, so that the safety of the diver cannot be guaranteed at all times.

SUMMARY

The present disclosure provides a system and method for determining transfer of driving control authority of a self-driving vehicle, which are capable of calculating a risk by recognizing the driver's sight line and surrounding environment when transferring the driving control authority of the self-driving vehicle, calculating a reference for determining whether to transfer the driving control authority when the driver operates the acceleration pedal, the deceleration pedal, and the handle, based on the calculated risk, and safely transferring the driving control authority from the self-driving vehicle to the user based on the calculated determination reference for the driving control authority transfer.

The technical problems to be solved by the present inventive concept are not limited to the aforementioned problems, and any other technical problems not mentioned herein will be clearly understood from the following description by those skilled in the art to which the present disclosure pertains.

In one aspect of the present disclosure, a system for determining transfer of driving control authority of a self-driving vehicle may include: a risk calculation device configured to recognize a sight line of a driver and to calculate a risk when the driving control authority of the self-driving vehicle is transferred; a determination reference calculation device configured to calculate a determination reference based on the calculated risk and configured to determine whether the driving control authority of an acceleration pedal, a deceleration pedal, and a steering wheel of the self-driving vehicle is able to be transferred, and a determination device configured to determine whether to transfer the driving control authority of the self-driving vehicle based on the calculated determination reference.

In addition, the risk calculation device may include a driver sight-line determination device that determines whether the sight line of the driver is directed to a traveling road In addition, the driver sight-line determination device may determine whether the sight line of the driver coincides with a preset forward view target point.

In addition, the determination reference calculation device may classify a current state into a state that the driver does not gaze on a traveling road, a current state that the driving control authority is normally transferred, and a state that the driving control authority is urgently transferred, such that the determination reference is calculated.

In addition, when the driver does not gaze on the traveling road, the determination reference calculation device may output the determination reference that the acceleration pedal, the deceleration pedal, or the steering wheel of the self-driving vehicle is uncontrollable.

In addition, when the sight line of the driver coincides with a preset forward view target point, the determination reference calculation device may classify the current state as the state where the driving control authority is normally transferred and thus may transfer the driving control authority to the driver.

In addition, the state that the driving control authority is urgently transferred may include a state that the driving control authority is transferred when a distance between the driver and the forward view target point is shortened or the sight line of the driver is rapidly changed in a dangerous situation with a nearby vehicle.

According to another form of the present disclosure, a method of determining transfer of driving control authority of a self-driving vehicle, which includes steps of recognizing, by a risk calculation device, a sight line of a driver and calculating a risk when the driving control authority of the self-driving vehicle is transferred; calculating, by a determination reference calculation device, a determination reference based on the calculated risk and determining whether the driving control authority of an acceleration pedal, a deceleration pedal, and a steering wheel of the self-driving vehicle is able to be transferred; and determining, by a determination device, whether to transfer the driving control authority of the self-driving vehicle based on the calculated determination reference.

In addition, the calculating of the risk may include determining whether the sight line of the driver is directed to a traveling road.

In addition, the determining of whether the sight line of the driver is directed to a traveling road may include determining whether the sight line of the driver coincides with a preset forward view target point.

In addition, the calculating of the determination reference may include classifying a current state into a state that the driver does not gaze on a traveling road, a state that the driving control authority is normally transferred, and a state that the driving control authority is urgently transferred.

In addition, the method may further include preventing the driving control authority from being transferred to the driver based on classifying the current state as a state where the acceleration pedal, the deceleration pedal, or the steering wheel of the self-driving vehicle is uncontrollable when the driver does not gaze on the traveling road.

In addition, the method may further include transferring the driving control authority to the driver when the sight line of the driver coincides with a preset forward view target point, which is classified as the state where the driving control authority is normally transferred.

In addition, the state that where driving control authority is urgently transferred may include a state where the driving control authority is transferred when a distance between the driver and the forward view target point is shortened or the sight line of the driver is rapidly changed in a dangerous situation with a nearby vehicle.

According to the present technology, a dangerous situation may be transferred in advance when a self-driving vehicle is overridden.

In addition, according to the present technology, the driving control authority may freely transfer between the self-driving vehicle and the driver.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
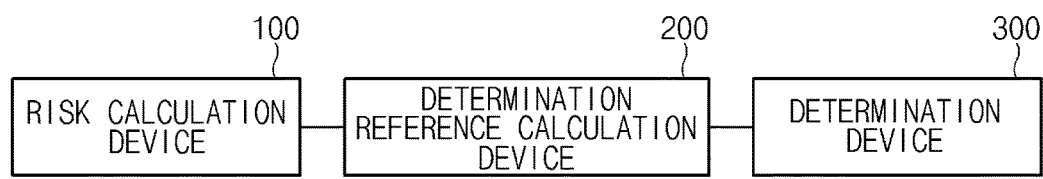
FIG. 1 is a block diagram illustrating a system for determining transfer of driving control authority of a self-driving vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Various advantages and features of the present disclosure and methods accomplishing them will become apparent from the following description of forms with reference to accompanying drawings.

As used herein, the term "and/or" includes any and all combinations of one or more of the associated listed items. It will be understood that when an element is referred to as being "connected" or "coupled" to another element, it may be directly connected or coupled to the other element or intervening elements may be present. Also, as used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, forms of the present disclosure will be described in detail with reference to accompanying drawings.

FIG. 1 is a block diagram illustrating a system for determining transfer of driving control authority of a self-driving vehicle in one form of the present disclosure.

Referring to FIG. 1, a system for determining transfer of driving control authority of a self-driving vehicle includes a risk calculation device 100, a determination reference calculation device 200, and a determination device 300. In this case, a system and a method for determining transfer of driving control authority of a self-driving vehicle may be referred to as a system and a method for determining an override of a self-driving vehicle.

The risk calculation device 100 recognizes a sight line of a driver for a forward view distance to calculate a risk when the driving control authority of the self-driving vehicle is transferred.

In detail, the risk calculation device 100 includes a driver sight-line determination device.

The driver sight-line determination device determines a state that a current driver does not look at a road, for example, reading or watching a movie (such as an eye-off state, a state that a driver closes his eyes, etc.).

In addition, the driver sight-line determination device determines whether the sight line of the driver coincides with a preset forward view target point (that may be referred to as a driving-oriented target point or a look-ahead point).

That is, the driver sight-line determination device may determine a position of a driver's sight line preset in the self-driving vehicle and a position of a sight line of a current driver to determine whether the driver is gazing at the front of a road on which the driver is traveling.

In addition, the driver sight-line determination device determines a dangerous situation around the self-driving vehicle measured through a sensor provided in the self-driving vehicle. That is, the driver sight-line determination device determines whether the distance between the driver and the forward view target point is shortened or the sight line of the driver is rapidly changed in a dangerous situation with a nearby vehicle.

In addition, the risk calculation device 100 may determines whether the self-driving vehicle recognized through the self-driving vehicle sensor provided thereon collides with a nearby vehicle. In particular, the risk calculation device 100 may determine the risk of the nearby vehicle by determining whether the self-driving vehicle collides with the nearby vehicle by predicting the longitudinal and lateral movements of the nearby vehicle.

The determination reference calculation device 200 calculates a determination reference based on the risk calculated by the risk calculation device 100, and the calculated determination reference is used for determining whether to transfer the driving control authority of an acceleration pedal, a deceleration pedal, and a steering wheel of the self-driving vehicle.

The determination device 300 determines whether to transfer the driving control authority of the self-driving vehicle based on the calculated determination reference.

Figure 2:
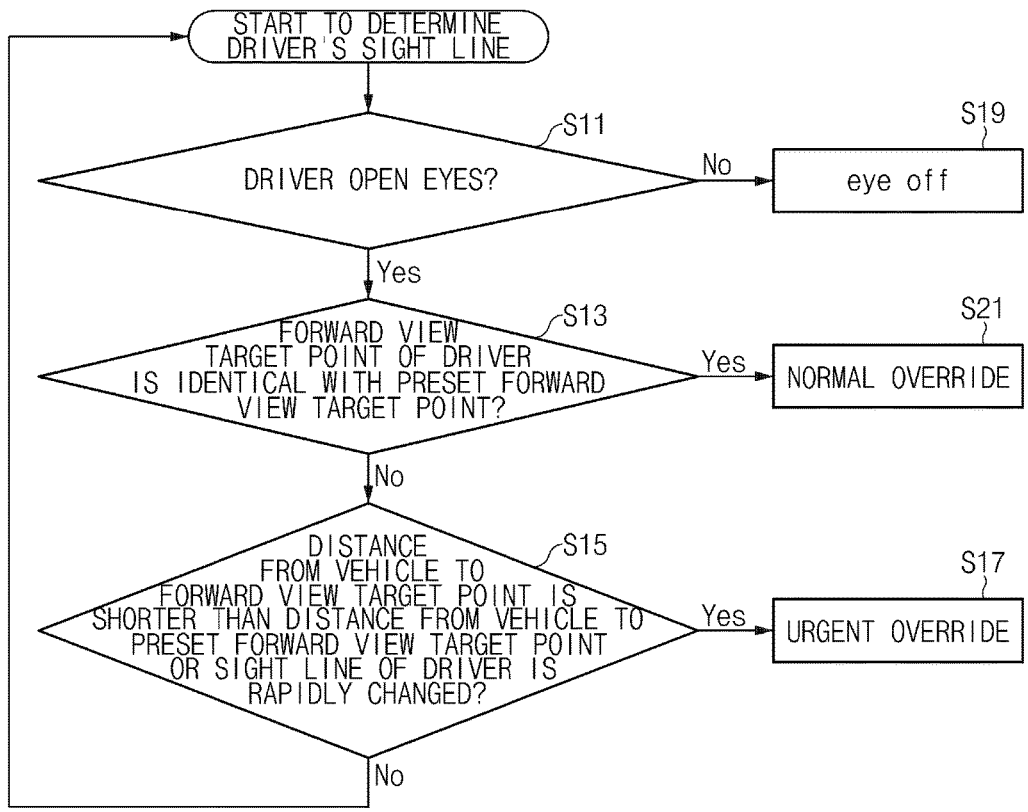
FIG. 2 is a flowchart illustrating a driver sight-line determination device of a self-driving vehicle.

Referring to FIG. 2, the driver sight-line determination device of the self-driving vehicle performs a method of calculating a risk by recognizing the sight line of the driver corresponding to the nearby vehicle or the forward view distance.

In operation S11, the driver sight-line determination device determines whether the driver opens his eyes on the road on which the self-driving vehicle is traveling.

In operation S13, the driver sight-line determination device determines whether a measured forward view target point of the driver is identical with the preset forward view target point.

In operations S15 and S17, when the measured forward view target point of the driver is different from the preset forward view target point (e.g., when a distance from the self-driving vehicle to the measured forward view target point of the driver is shorter than a distance from the self-driving vehicle to the preset forward view target point), the driver sight-line determination device performs urgent transfer (i.e., urgent override) of driving control authority.

However, if the driver sight-line determination device determines that the driver does not open his eyes as the determination result of operation S11, the driver sight-line determination device determines that the driver closes his eyes in operation S19.

In addition, when the driver sight-line determination device determines, in operation S13, that the measured forward view target point of the driver is identical with the preset forward view target point, the driver sight-line determination device performs normal driving control authority transfer (normal override) in operation S21.

FIGS. 3A to 3G are views illustrating a method of determining transfer of driving control authority of a self-driving vehicle in one form of the present disclosure.

Referring to FIGS. 3A to 3G, the determination reference calculation device of the self-driving vehicle classifies a current state into a state that the driver does not gaze on a traveling road, a state that the driving control authority is normally transferred, and a state that the driving control authority is urgently transferred, and calculates the determination reference for determining whether the driving control authority is able to be transferred.

In this case, the determination reference calculation device of the self-driving vehicle may measure a degree of pedal depression by the driver to determine in detail whether the driving control authority is transferred.

Figure 3A:
FIGS. 3A to 3G are views illustrating a method of determining transfer of driving control authority of a self-driving vehicle.
Figure 3B:
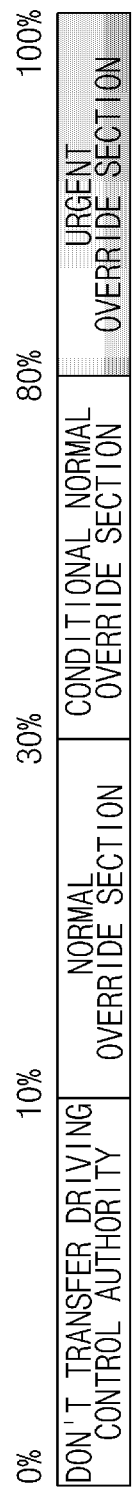

Referring to FIG. 3A, the state that the driver does not gaze on the road on which the driver is traveling is when the control of the acceleration pedal, the deceleration pedal or the steering wheel of the vehicle is completely impossible.

Referring to FIG. 38, in the normal override state, the driver may receive the driving control authority when the driver's sight line coincides with the preset forward view target point (driving-oriented target point or look-ahead point).

For example, while the self-driving vehicle is traveling at a constant speed of 80 kph on a highway, the determination reference calculation device may determine the condition to transfer the driving control authority by using the acceleration pedal of the self-driving vehicle. For the determination of this condition, a degree of the acceleration pedal depression by the driver can be calculated in the range of 0% to 100%.

First, in the section where the transfer of the driving control authority cannot be transferred (e.g., in a case that a depression reference of the acceleration pedal is in the range of 0% to 10%), the driving control authority cannot be transferred to the driver since it is impossible for a driver to control the self-driving vehicle to travel at the constant speed of 80 kph on the highway.

Next, in the normal override section (e.g., in a case that the depression reference of the acceleration pedal is in the range of 10% to 30%), since it is possible to maintain the constant speed of 80 kph on the highway, the driving control authority may be transferred to the driver.

Next, in the conditional normal override section (e.g., in a case that the depression reference of the acceleration pedal is in the range of 30% to 80%), the self-driving vehicle may be accelerated to more than 80 kph on the highway. It may be determined whether there is a problem in transferring the driving control authority to the driver when the self-driving vehicle is accelerated, so that the driving control authority may be transferred or not transferred to the driver.

In an urgent override section (e.g., in a case that the depression reference of the acceleration pedal is in the range of 80% to 100%), even though the driver's sight line does not coincide with the preset forward view target point, the driving control authority may be transferred to the driver.

Figure 3C:

Referring to FIG. 3C, the determination reference calculation device may determine the condition to transfer the driving control authority by using the deceleration pedal (e.g., a brake pedal) of the self-driving vehicle while the self-driving vehicle is traveling at the constant speed of 80 kph on a highway. For the determination of the condition, a degree of brake pedal depression by the driver is calculated in the range of 0% to 100%.

First, in the normal override section (e.g., in a case that the depression reference of the brake pedal is in the range of 0% to 10%), since the self-driving vehicle is slowly decelerated from 80 kph on a highway, the driving control authority may be transferred to the driver.

Next, in the conditional normal override section (e.g., in a case that the depression reference of a brake pedal is in the range of 10% to 40%), the self-driving vehicle may be rapidly decelerated from 80 kph on a highway. It may be determined whether there is a problem in transferring the driving control authority to the driver when the self-driving vehicle is decelerated, so that the driving control authority may not be transferred.

In the urgent override section (e.g., in a case that the depression reference of the brake pedal is in the range of 40% to 100%), even though the driver's sight line does not coincide with the preset forward view target point, the driving control authority may be transferred to the driver.

Figure 3D:
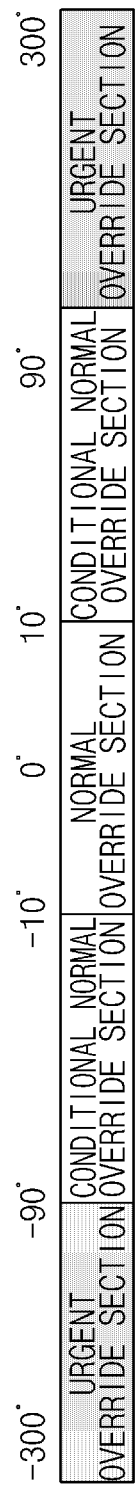

Referring to FIG. 3D, the determination reference calculation device may determine the condition to transfer the driving control authority by using the steering wheel (e.g., steering apparatus) of the self-driving vehicle while the self-driving vehicle is traveling at a constant speed of 80 kph on a highway. For the condition determination, a degree of a steering wheel operation by the driver is calculated in the range of −300° to +300°.

First, in the normal override section (e.g., in a case that an operation reference of the steering wheel is in the range of −10° to +10°), the driving control authority may be transferred to the driver after determining whether steering control is performed, such that the lane is maintained while the self-driving vehicle is traveling.

In the conditional normal override section (e.g., in a case that the operation reference of the steering wheel is in the range of −90° to −10° or 90° to 10°), the driving control authority may not be transferred to the driver according to an angle condition which is an angle at which the lane may be changed.

Next, in the urgent override section (e.g., in a case that the operation reference of the steering wheel is in the range of −90° to 300° or 90° to 300°), the driving control authority may be transferred to the driver in spite of the risk of an accident.

Figure 3E:

Referring to FIG. 3E, in the urgent section, the driving control authority may be transferred to the driver in a situation in which the driver gazes at a collision possible vehicle or the distance between the driver's sight line and the forward view target point is shortened.

For example, when the self-driving vehicle is in a situation where an automatic emergency braking system (AEB) is to be operated in a front collision risk situation caused due to an unexpected lane crossing of the preceding vehicle, the determination reference calculation device may determine the condition to transfer the driving control authority by using the acceleration pedal of the self-driving vehicle. In order to determine the condition, a degree of acceleration pedal depression by the driver may be calculated in the range of 0% to 100%.

First, in a section in which the driving control authority cannot be transferred (e.g., in a case that the depression reference of the acceleration pedal is in the range of 0% to 80%), it may be determined that there is a danger of a forward collision, so that the driving control authority is not transferred to the driver by using the acceleration pedal.

Next, in the urgent override section (e.g., in a case that the depression reference of the accelerator pedal is in the range of 80% to 100%), the driving control authority may be transferred to the driver in spite of the risk of a vehicle accident.

Figure 3F:

Referring to FIG. 3F, when the self-driving vehicle is in a situation where the AEB is to be operated in a front collision risk situation caused due to an unexpected lane crossing of the preceding vehicle, the determination reference calculation device may determine the condition to transfer the driving control authority by using the deceleration pedal of the self-driving vehicle. For the condition determination, a degree of deceleration pedal depression (i.e., a degree of brake pedal depression) by the driver is calculated in the range of 0% to 100%.

First, in a section in which the driving control authority cannot be transferred (e.g., in a case that the depression reference of the brake pedal is in the range of 0% to 80%), it may be determined that there is a danger of a forward collision, so that the driving control authority is not transferred to the driver by using the deceleration pedal.

Next, in the urgent override section (e.g., in a case that the depression reference of the brake pedal is in the range of 80% to 100%), the driving control authority may be transferred to the driver when the deceleration pedal is used to reduce the speed of the self-driving vehicle at a preset deceleration or more.

Figure 3G:
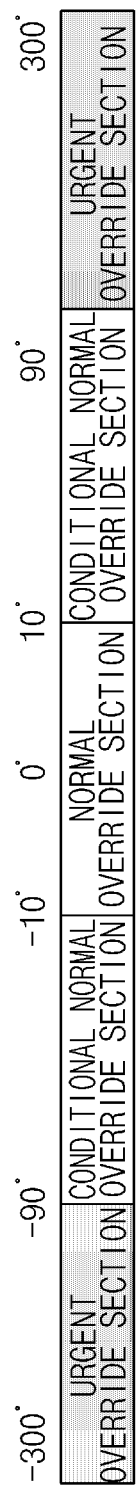

Referring to FIG. 3G, when the self-driving vehicle is in a situation where the AEB is to be operated in a front collision risk situation caused due to an unexpected lane crossing of the preceding vehicle, the determination reference calculation device may determine the condition to transfer the driving control authority by using the steering wheel of the self-driving vehicle. Here, for the condition determination, a degree of a steering wheel operation by the driver is calculated in the range of −300° to +300°.

First, in the normal override section (e.g., in a case that an operation reference of the steering wheel is in the range of −10° to +10°), the driving control authority may be transferred to the driver by controlling the steering wheel at a predetermined angle or less, such that the lane is maintained while the self-driving vehicle is traveling.

In the conditional normal override section (e.g., in a case that the operation reference of the steering wheel is in the range of −90° to −10° or 90° to 10°), the driving control authority may not be transferred to the driver based on an angle condition which is an angle at which the lane may be changed.

Next, in the urgent override section (e.g., in a case that the operation reference of the steering wheel is in the range of −90° to 300° or 90° to 300°), the driving control authority may be transferred to the driver in spite of the risk of an accident.

Figure 4:
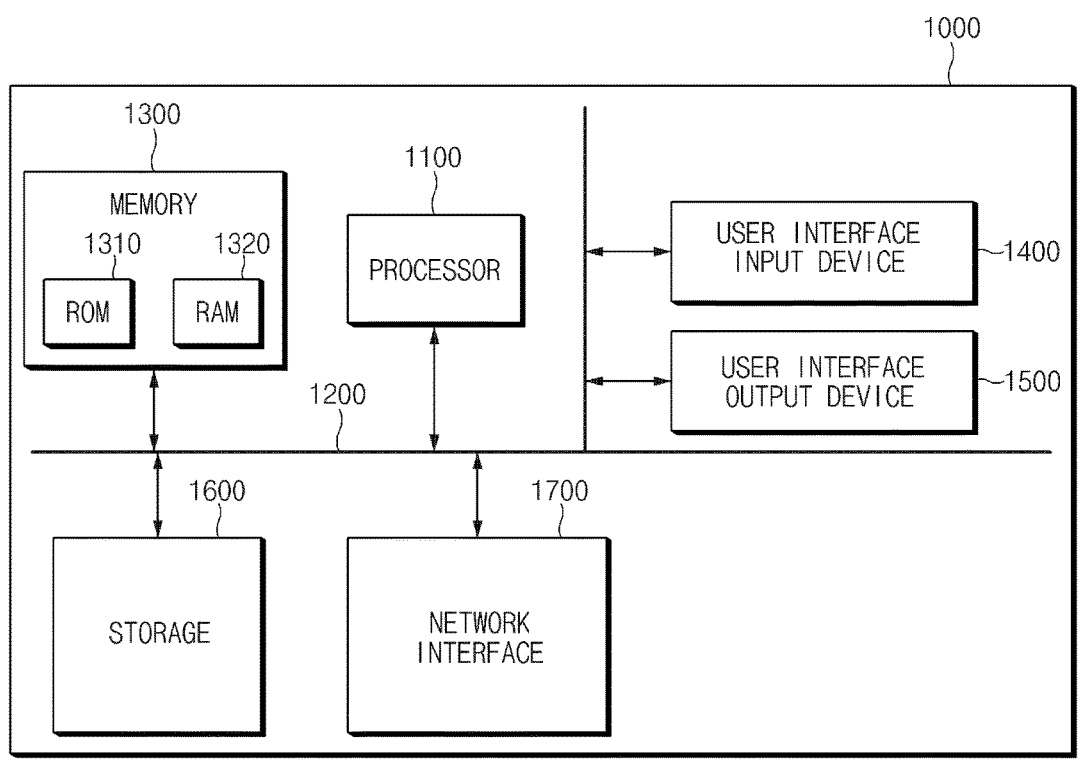
FIG. 4 is a block diagram illustrating a computer system executing a method of determining transfer of driving control authority of a self-driving vehicle.

FIG. 4 is a block diagram illustrating a computer system executing a method of determining override of a self-driving vehicle in one form of the present disclosure.

Referring to FIG. 4, a computing system 1000 may include at least one processor 1100, a memory 1300, a user interface input device 1400, a user interface output device 1500, a storage 1600, and a network interface 1700, which are connected to each other through a bus 1200.

The processor 1100 may be a central processing device (CPU) or a semiconductor device which performs processing for instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the forms disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), etc. An exemplary storage medium is coupled to the processor 1100 such that the processor 1100 may read information from, and write information to, the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

The present technology may reduce or prevent a dangerous situation in advance when a self-driving vehicle is overridden.

In addition, the present technology may freely transfer the driving control authority between the self-driving vehicle and the driver.

The above-described method may be recorded as a computer program. A code and a code segment constituting the program may be readily inferred by a computer programmer in the field. In addition, the program may be stored in computer-readable recording media (e.g., information storage media) and may be read and executed by a computer, thereby implementing the method of the present disclosure. The recording media may include any types of computer-readable recording media.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A system for determining a transfer of driving control authority of a self-driving vehicle, the system comprising:
 a risk calculation device configured to recognize a sight line of a driver and configured to calculate a risk when the driving control authority of the self-driving vehicle is transferred from the self-driving vehicle to the driver;
 a determination reference calculation device configured to calculate a determination reference based on the calculated risk and configured to determine whether the driving control authority of an acceleration pedal, a deceleration pedal, and a steering wheel of the self-driving vehicle is able to be transferred from the self-driving vehicle to the driver; and
 a determination device configured to determine whether to transfer the driving control authority of the self-driving vehicle based on the calculated determination reference.

2. The system of claim 1, wherein the risk calculation device includes a driver sight-line determination device configured to determine whether the sight line of the driver is directed to a traveling road.

3. The system of claim 2, wherein the driver sight-line determination device is configured to determine whether the sight line of the driver coincides with a preset forward view target point.

4. The system of claim 1, wherein the determination reference calculation device is configured to classify a current state into a state where the driver does not gaze on a traveling road, a normal state where the driving control authority is normally transferred, and a state where the driving control authority is urgently transferred, such that the determination reference is calculated.

5. The system of claim 4, wherein when the driver does not gaze on the traveling road, the determination reference calculation device is configured to output the determination reference that the acceleration pedal, the deceleration pedal, or the steering wheel of the self-driving vehicle is uncontrollable.

6. The system of claim 4, wherein when the sight line of the driver coincides with a preset forward view target point, the determination reference calculation device is configured to classify the current state as the state where the driving control authority is normally transferred and configured to transfer the driving control authority to the driver.

7. The system of claim 4, wherein the state where the driving control authority is urgently transferred includes:
 a state where the driving control authority is transferred when a distance between the driver and the forward view target point is shortened or the sight line of the driver is rapidly changed in a dangerous situation with a nearby vehicle.

8. A method of determining transfer of driving control authority of a self-driving vehicle, the method comprising steps of:
 recognizing, by a risk calculation device, a sight line of a driver and calculating a risk when the driving control authority of the self-driving vehicle is transferred from the self-driving vehicle to the driver;
 calculating, by a determination reference calculation device, a determination reference based on the calculated risk and determining whether the driving control authority for an acceleration pedal, a deceleration pedal, and a steering wheel of the self-driving vehicle is able to be transferred from the self-driving vehicle to the driver; and
 determining, by a determination device, whether to transfer the driving control authority of the self-driving vehicle based on the calculated determination reference.

9. The method of claim 8, wherein the step of calculating the risk includes:
 determining whether the sight line of the driver is directed to a traveling road.

10. The method of claim 9, wherein the step of determining whether the sight line of the driver is directed to the traveling road includes:
 determining whether the sight line of the driver coincides with a preset forward view target point.

11. The method of claim 9, wherein the step of calculating the determination reference includes:
 classifying a current state into a state where the driver does not gaze on the traveling road, a state where the driving control authority is normally transferred, and a state where the driving control authority is urgently transferred.

12. The method of claim 11, further comprising:
 preventing the driving control authority from being transferred to the driver based on classifying the current state as a state where the acceleration pedal, the deceleration pedal, or the steering wheel of the self-driving vehicle is uncontrollable when the driver does not gaze on the traveling road.

13. The method of claim 11, further comprising:
 transferring the driving control authority to the driver when the sight line of the driver coincides with a preset forward view target point, which is classified as the state where the driving control authority is normally transferred.

14. The method of claim 11, wherein the state where the driving control authority is urgently transferred includes:
 a state where the driving control authority is transferred when a distance between the driver and the forward view target point is shortened or the sight line of the driver is rapidly changed in a dangerous situation with a nearby vehicle.

* * * * *